United States Patent
Phanco et al.

(10) Patent No.: US 6,691,511 B1
(45) Date of Patent: Feb. 17, 2004

(54) FILTER FOR HYDROSTATIC TRANSMISSION

(75) Inventors: Eric S. Phanco, Decatur, IL (US); Raymond M. Hauser, Sullivan, IL (US); Lonnie E. Holder, Sullivan, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 140 days.

(21) Appl. No.: 10/097,703

(22) Filed: Mar. 13, 2002

(51) Int. Cl.[7] ............................................. F16D 31/02
(52) U.S. Cl. ........................... 60/464; 60/468; 184/6.24
(58) Field of Search ........................... 60/464, 467, 587; 184/6.24

(56) References Cited

U.S. PATENT DOCUMENTS

| 4,905,472 | A | * | 3/1990 | Okada | 60/464 |
|---|---|---|---|---|---|
| 4,995,971 | A | * | 2/1991 | Droste et al. | 184/6.24 |
| 5,031,403 | A | * | 7/1991 | Okada | 60/464 |
| 5,099,954 | A | * | 3/1992 | Kikuchi et al. | 184/6.24 |
| 5,314,387 | A | | 5/1994 | Hauser et al. | |
| 6,185,936 | B1 | | 2/2001 | Hauser et al. | |
| 6,318,080 | B2 | * | 11/2001 | Hauser et al. | 60/468 |

* cited by examiner

Primary Examiner—Edward K. Look
Assistant Examiner—Igor Kershteyn
(74) Attorney, Agent, or Firm—Neal, Gebber & Eisenberg LLP

(57) ABSTRACT

In a hydrostatic transmission or integrated hydrostatic transaxle having a housing forming an oil sump and a hydraulic pump and hydraulic motor mounted in the sump and connected through hydraulic porting, a filter housing or other structure defining an internal volume is mounted adjacent to the check valves for the hydraulic porting. Oil passing into this internal volume is filtered to prevent the introduction of contaminants into the hydraulic porting. A chimney is formed as part of the filter housing and extends upwards therefrom, and is open to the internal volume. The chimney also includes an opening to permit air to escape to the oil sump, to reduce the risk of air being introduced into the hydraulic porting through the check valves.

22 Claims, 4 Drawing Sheets

FILTER FOR HYDROSTATIC TRANSMISSION

BACKGROUND OF THE INVENTION

This invention relates to the design of hydrostatic transmissions and integrated hydrostatic transaxles (IHT) and more particularly to an improved filter design for use with such transmissions and transaxles. The discussion of the invention herein will focus on an IHT as the preferred embodiment; however, it will be understood that this invention could be used with other hydrostatic designs as well.

Such an IHT will generally comprise a hydrostatic pump and motor mounted on a center section, where the hydraulic porting is formed into the body of the center section. It is generally understood that in an IHT the hydrostatic transmission and the gear elements are generally running in the same oil sump. This means such contaminants from the rotating gears, such as metal shavings, will be in the oil, and a filter is needed to prevent such contaminants from entering into the hydrostatic porting and damaging the running surfaces for the rotating cylinder blocks of the hydrostatic transmission. Check valves may be formed in the center section and opened at various times to permit oil to flow from the main oil sump into the hydraulic porting formed in the center section. It is generally known to provide a filter that covers these check valves or otherwise filters the oil before it can enter the check valves. One such known design is shown in U.S. Pat. No. 5,314,387 where the filter is a cap placed on the bottom of the center section, and the filter element is formed around the periphery thereof. A second known design is shown in U.S. Pat. No. 6,185,936 where the filter element is on the bottom surface of the cap placed over the bottom of the center section.

It is also well known that excess air in an IHT system can cause noise and early failure of the hydrostatic elements. When an IHT is being assembled, the air is purged from the system, which means that all of the air in the center section and the hydrostatic porting therein is removed and replaced by hydraulic oil. There are occasions, however, for servicing of such an IHT unit in the field; during such servicing it is difficult to completely purge air from the IHT unit and in particular from the center section. Because of the geometry of the center section and oil filter, air may remain trapped therein after the completion of purging. The air trapped in the filter will be adjacent to the check valves, and thus there is risk that the air will be drawn into the center section through the check valves. Furthermore, air can coalesce from the oil during operation to form bubbles that can also become trapped adjacent to the check valves.

SUMMARY OF THE INVENTION

It is an object of this invention to provide an improved filter design which includes a filter housing having an escape valve which permits air to escape from the filter housing but which prevents contaminants from entering. In the preferred embodiment, the filter housing is mounted on the bottom of an IHT center section, and a tubular stack or chimney is formed with the filter housing to provide a volume for air to flow to during purging and operation of the unit. This invention may also be used with other hydrostatic designs where the filter is located below the check valves of the hydraulic porting. Such porting need not be in a standard center section, but could also be located in a plate or in the transmission housing itself.

As a further feature of this invention, an opening and poppet assembly is provided on the filter housing, and preferably at the top of the chimney, to assist in exhausting air out of the chimney and at the same time to prevent contaminants from entering the filter housing.

The poppet is denser than the oil and thus will tend to sink. There is an upward force on the poppet equal to the weight of the fluid it displaces. When air begins to build up adjacent to the poppet in the filter chimney, the fluid sees the air and the poppet as a single object and thus the upward force thereon increases as air displaces oil in the chimney. The poppet will open and air will escape from the opening when the upward pressure on the air bubble and poppet is sufficient to overcome the relatively negligible weight of the air bubble and poppet and the surface tension of the oil/air interface.

Further benefits and objects of this invention will be apparent to one of ordinary skill in the art from a review of the drawings in the following detailed description of the preferred embodiment.

DETAILED DESCRIPTION OF THE DRAWINGS

Figure 1:
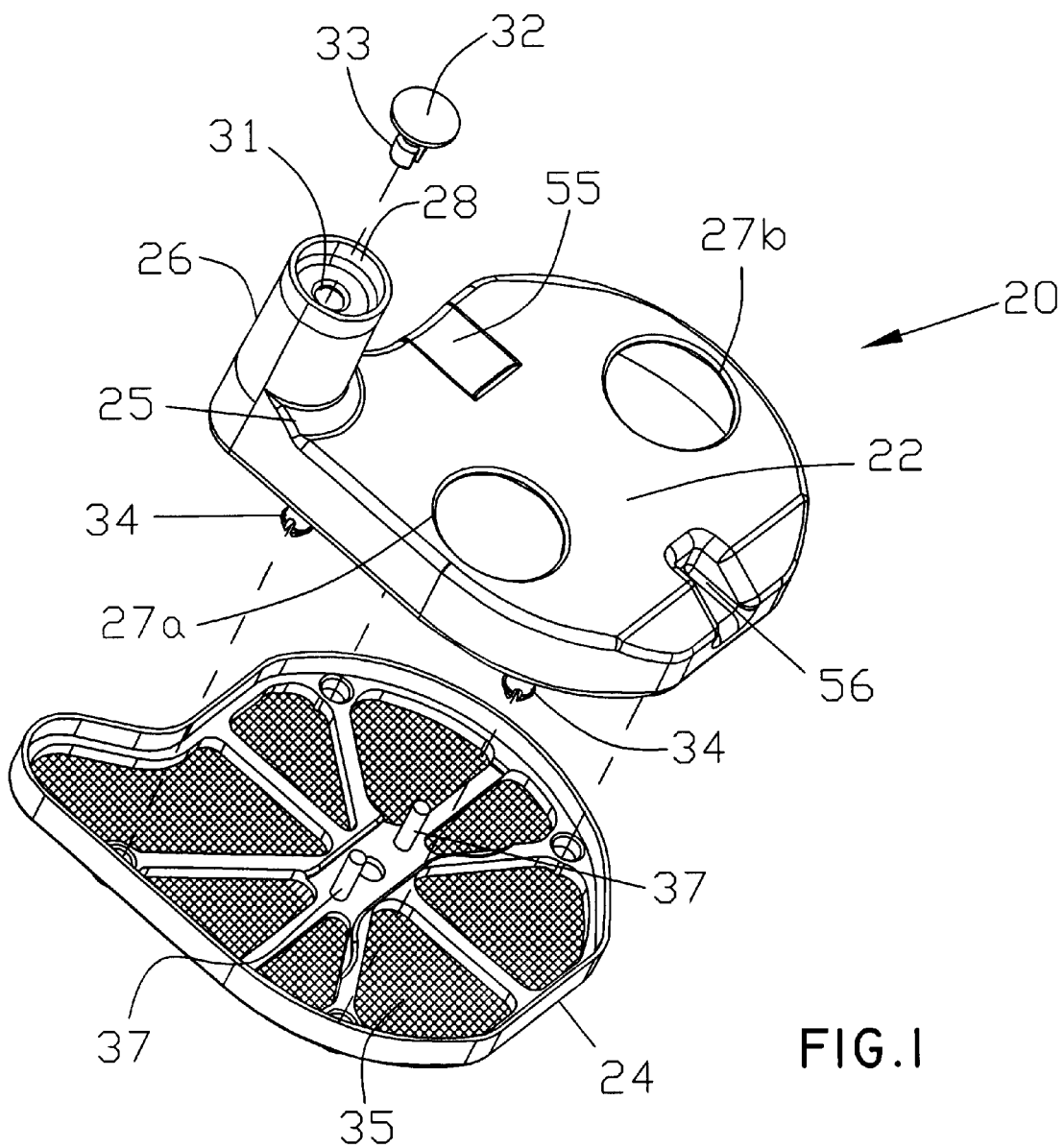
FIG. 1 is an exploded perspective view of a filter housing and filter in accordance with this invention.

As shown in FIG. 1, the filter assembly 20 is comprised of a filter housing 22 secured to filter frame 24, which includes filter mesh 35, by means of snap connectors 34. Filter assembly 20 is designed for use in connection with an integrated hydrostatic transaxle such as is shown in U.S. Pat. No. 6,185,936, the terms of which are incorporated herein by reference. Since most of the operation of the integrated hydrostatic transaxle is known and is disclosed in the aforementioned patent, it will not be discussed in detail here. It will be understood that the invention can be used in connection with other IHT designs as well.

Figure 4:
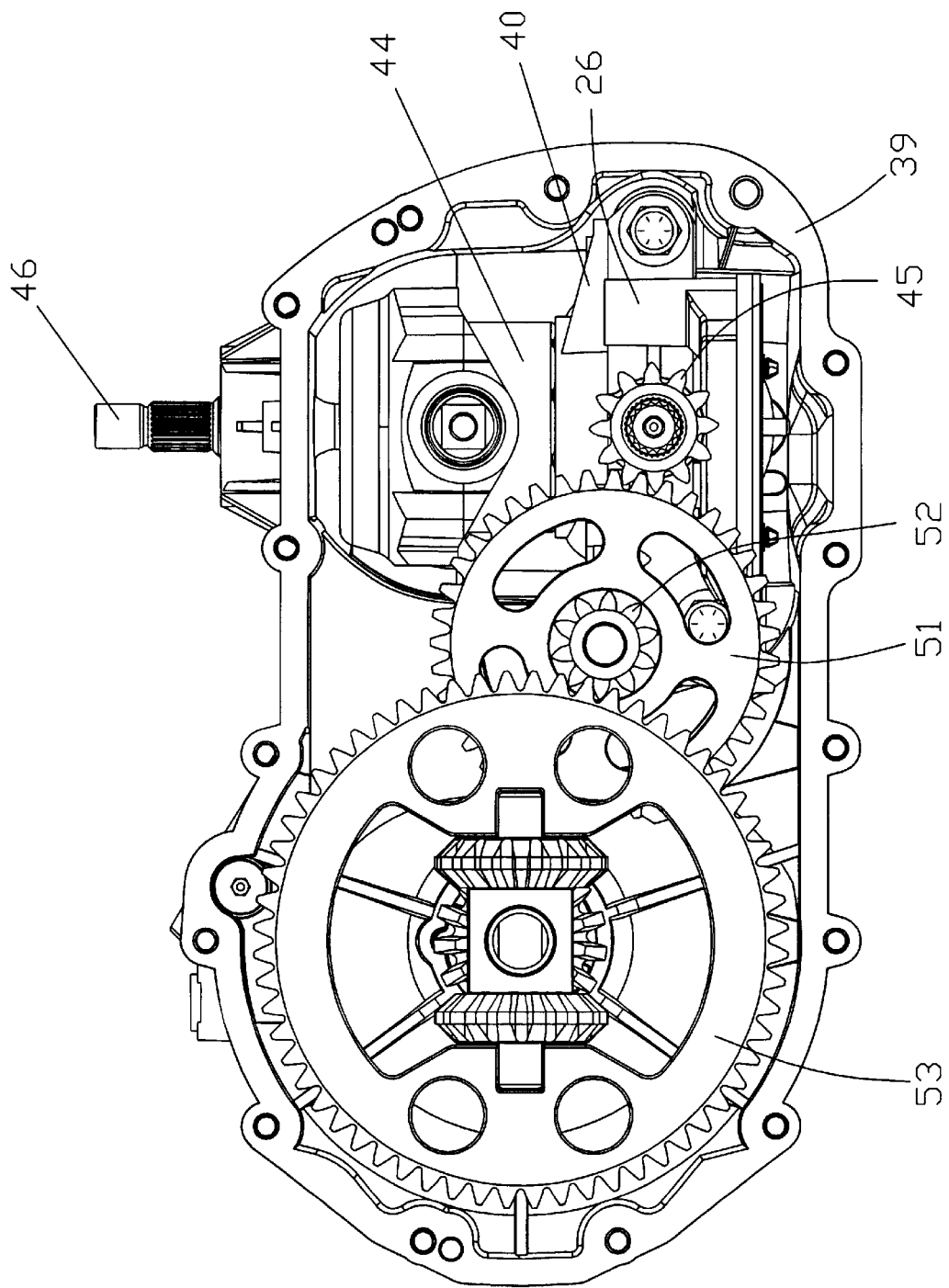
FIG. 4 is a side view of an integrated hydrostatic transaxle assembly incorporating the filter assembly in accordance with the present invention.
Figure 5:
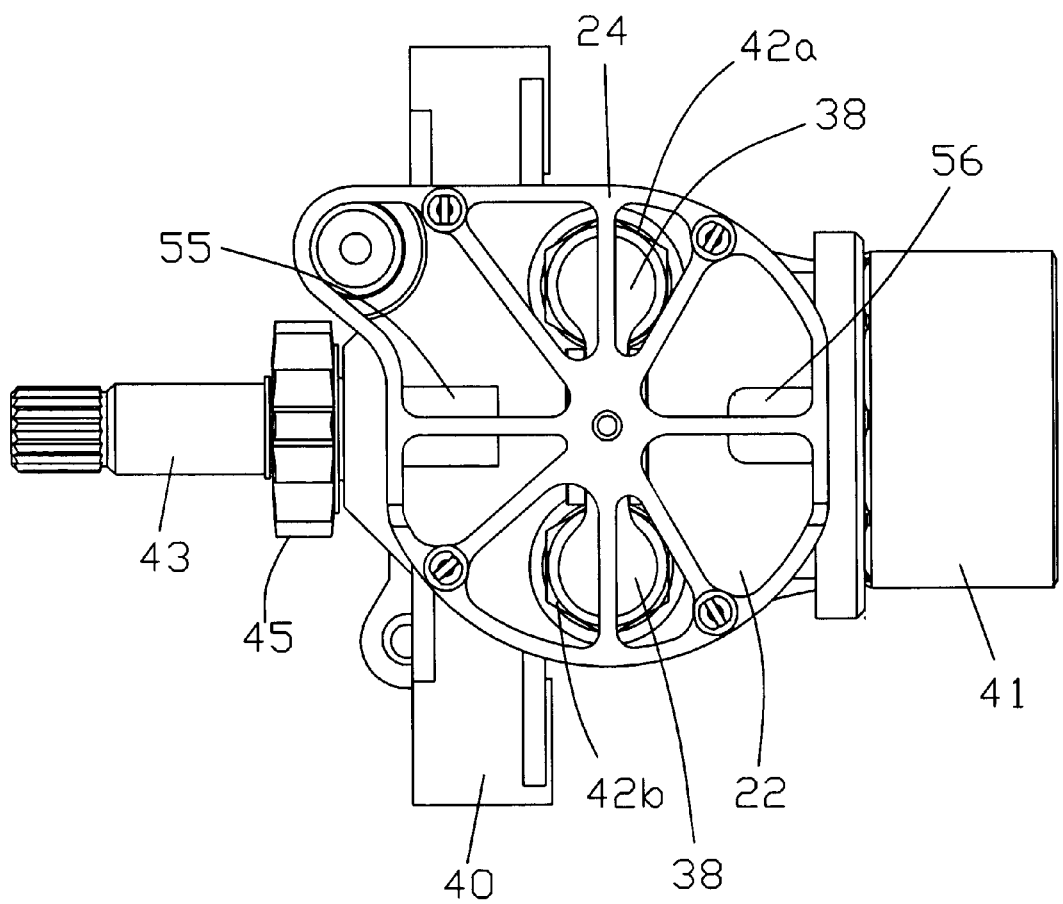
FIG. 5 is a bottom view of an IHT center section and hydraulic motor and motor shaft assembly showing the filter housing secured thereto, with the filter mesh removed for clarity.

Relevant elements of the IHT design used with the preferred embodiment of this invention are shown in FIGS. 4 and 5. As is known, input shaft 46 is driven by a prime mover (not shown) and is engaged to pump 44. Pump 44 and motor 41 are both mounted on center section 40, which includes hydraulic porting (not shown) to hydraulically connect pump 44 and motor 41 in a known matter. In the preferred embodiment, pump 44 and motor 41 are of the axial piston design and have rotating cylinder blocks housing a plurality of pistons, although it is understood that other designs could be used. Motor shaft 43 is engaged to motor 41 and rotates therewith. Motor shaft 43 drives motor gear 45 which is engaged to a gear train comprising reduction gears 51 and 52 which are similarly engaged to a differential input gear 53. The differential assembly is engaged to and drives a plurality of axles (not shown) for the vehicle. This entire structure is mounted inside a housing comprising a main housing 39 and a side housing (not shown) which would be secured thereto to form a sealed common sump. It will be understood that other housing designs could be used in accordance with the teachings of this invention. For example, a housing having an upper casing and a lower casing joined along a split line parallel to the axles could also be used. It will also be understood that the gearing and differential could be different and need not be present. By way of example, this invention could be used with a transmission having only a single output axle mounted in the housing and no differential, or it could be used in a hydrostatic transmission without the reduction gearing in the same housing.

As shown in FIG. 5, check valves 42a and 42b are secured to the bottom of center section 40 in a known matter to allow fluid flow into the hydraulic circuit for pump 44 and motor 41. Filter frame 24 is shown without mesh 35 in FIG. 5 for purposes of clarity. Filter housing 22 includes two openings 27a and 27b formed therein for check valves 42a and 42b to be secured to the center section. Thus, in this embodiment, the check valves themselves act to secure filter housing 22 to the bottom of center section 40. Filter housing 22 could be secured to center section 40 or otherwise retained in the proper place by other known methods. Shield 38 is positioned on tabs 37 formed on filter frame 24, and provides protection to filter mesh 35 from oil which may discharge from high pressure bleeds (not shown) formed in check valves 42a and 42b.

Figure 2:
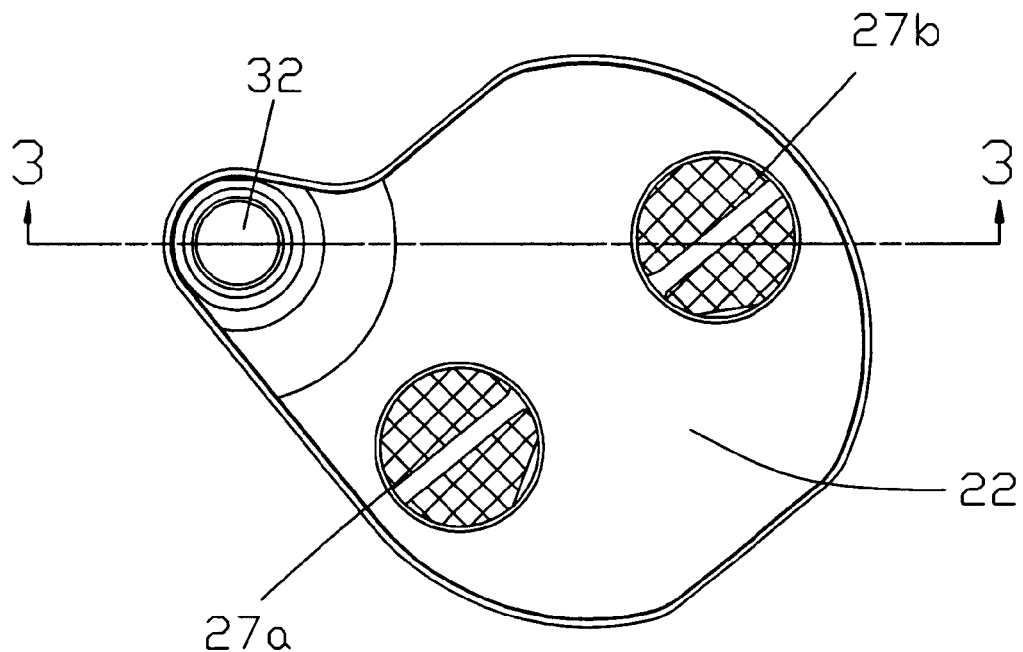
FIG. 2 is a top plan view of the filter assembly in FIG. 1.

As shown most clearly in FIGS. 1 and 2, filter housing 22 includes a chimney 26 which extends vertically therefrom at one end. Chimney 26 defines an internal volume 29. It will also be understood that chimney 26 could also be formed with another structure forming an internal volume adjacent to the check valves 42a and 42b of the center section. For example, the filter could be located elsewhere in the sump, and oil could be passed through tubing or other passages to this separate structure which would store filtered oil for the check valves 42a and 42b.

If air is in the system, it is likely to collect along the inner top surface of filter housing 22 adjacent openings 27a and 27b. The top of filter housing 22 includes a slanted surface 25 formed therein and adjacent to chimney 26. This surface provides for a flow route for air to leave the main body of filter housing 22 and enter into chimney 26. It also eliminates the risk that a burr or other imperfection formed on the filter housing, which is preferably made of plastic, would provide a barrier against which air bubbles could be retained. Notches 55 and 56 are formed on the top outer surface of filter housing 22, and correspond to matching projections (not shown) on the bottom of center section 40 and serve as guides to assist in assembly.

Chimney 26 includes an upper recess 28 formed therein and open to the main oil sump and an opening 31 to allow air to flow into the main oil sump. A poppet 32 comprised of a cap and snap fingers 33 is placed in the opening 31. Recess 28 thus forms a lip or raised surface around opening 31 and acts as a deflector to prevent turbulence in the hydraulic oil from acting to lift poppet 32 off its resting surface.

In the preferred embodiment, chimney 26 is a generally tubular shape with a circular cross-section having a radius of approximately 0.325 in. and it extends approximately one (1) inch above the top surface of filter housing 22. Similarly, in the preferred embodiment, the top surface of poppet 32 has a diameter of 0.50 in.; the top surface has a thickness of approximately 0.04 in.; and snap fingers 33 are approximately 0.44 in. in length measured from the underside of the top surface. Other shapes and arrangements of these elements are possible within the scope of this invention, and these sizes and shapes are dictated primarily by the surface tension of the hydraulic oil. For example, the required size and shape of poppet 32 will depend upon the height of chimney 26 and the properties of the hydraulic oil; a design having a shorter chimney, or no chimney with opening 31 located directly on filter housing 22, will require a poppet having a different size and configuration to ensure that it will properly lift off its resting surface as described herein.

Figure 3:
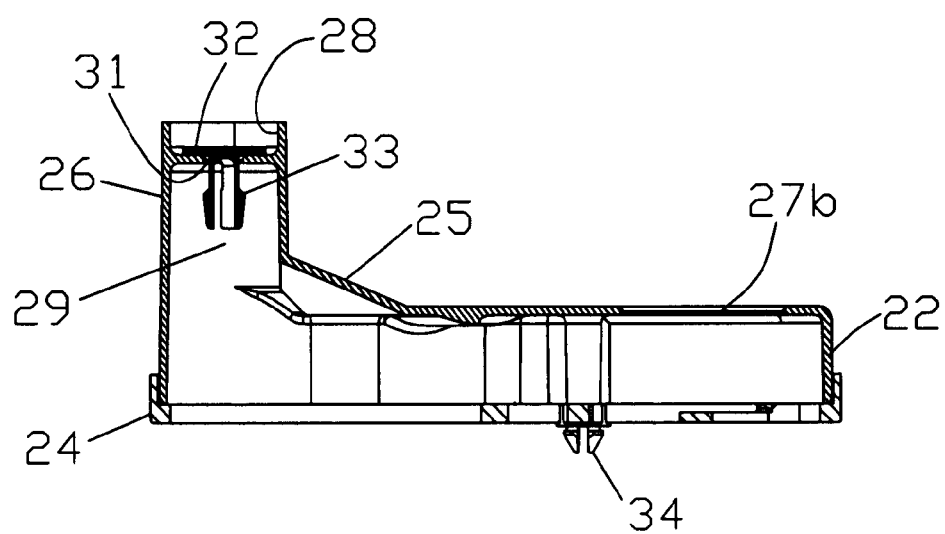
FIG. 3 is a cross-sectional side view of the filter assembly shown in FIG. 2, along the lines 3—3.

As can be seen in FIG. 3, poppet fingers 33 are shaped to permit the poppet to move up and down within opening 31. Oil pressure on the top of poppet 32 and/or the weight of poppet 32 will prevent oil and the contaminants therein from entering through opening 31 into the main filter housing 22. When air enters into volume 29, an upward pressure is created against poppet 32. As the pressure on the bottom of poppet 32 becomes sufficiently high, it will lift poppet 32 off of its base to permit the air to escape through opening 31 into the main oil sump.

It is important that the underside of poppet 32 and the top of upper recess 28 where poppet 32 rests not be flat and parallel, due to the inability of fluid to penetrate the interface between two very flat components, particularly when you attempt to move the two components apart in a direction perpendicular to the interface surfaces. In the preferred embodiment, these parts are manufactured using injection molding and the manufacturing tolerances involved prevent such flatness from being a problem. If a manufacturing technique is used which would yield relatively flat surfaces, it is recommended that one of the two surfaces be chamfered or beveled slightly (the angle can be very tiny; essentially the surfaces should be nonparallel) to have more of a line contact versus a plane contact.

Once poppet 32 is open, the surface tension of the oil and air interface becomes critical. If the space available around fingers 33 as it sits in opening 31 is too small, the surface tension of the oil will be so great that the bubble in chimney 26 cannot pass through the interface. The dimensions for the preferred embodiment were determined experimentally to avoid these concerns. In the preferred embodiment, opening 31 has a diameter of 0.22 inches, while the diameter of fingers 33 is 0.18 inches and the space between fingers 33 is 0.10 inches. A further advantage of the present design is that the entire poppet 31 can move to one side once open, which allows a bigger space. In addition, the gap between fingers 33 provides an additional space for air to escape from chimney 26.

The foregoing description of the preferred embodiment should not be read as limiting the invention, as other changes and modifications may be made within the spirit and scope of this invention. This invention should be read as limited by the following claims only.

What is claimed is:

1. A filter for a hydrostatic transmission assembly having a housing forming an oil sump, said filter comprising:
    a filter housing defining an internal volume;
    a filter mounted on said filter housing for filtering oil passing from said oil sump into said internal volume;
    a chimney, extending upwards from said filter housing, having an opening at the top thereof through which air is allowed to escape from said chimney into said oil sump.

2. A filter as set forth in claim 1, further comprising a poppet mounted in said opening in said chimney, said poppet having a top surface shaped to prevent contaminants in said oil sump from entering said opening.

3. A filter as set forth in claim 2, wherein said chimney further comprises a lip formed around the periphery of said chimney at the top thereof.

4. A filter as set forth in claim 1, wherein the chimney is integrally formed as part of said filter housing.

5. A filter as set forth in claim 3, wherein said filter housing comprises:
- a top section having a generally flat upper surface, wherein said chimney extends upwards from and generally perpendicular to said top section, and said top section has a slanted surface extending upwards from said generally flat upper surface to connect said flat upper surface and said chimney; and
- a bottom section on which said filter is mounted connected to said top section to form said interior volume.

6. An axle driving apparatus comprising:
- a housing forming an oil sump;
- a filter housing secured in said housing defining an internal volume;
- a filter mounted to said filter housing to filter oil passing from said sump to said internal volume;
- a center section secured in said housing having check openings to permit oil to pass from said internal volume into hydraulic porting formed in said center section;
- a hydraulic pump and hydraulic motor rotatably mounted on said center section and connected through said hydraulic porting; and
- a chimney formed adjacent to and extending upwardly from said internal volume of said filter housing having an opening to permit air to move from said internal volume to said sump.

7. An axle driving apparatus as set forth in claim 6, wherein said check openings are formed on the bottom of said center section and said filter comprises a generally flat membrane secured to the bottom of said filter housing.

8. A filter as set forth in claim 7, wherein the chimney is integrally formed as part of said filter housing and is generally tubular in shape.

9. A filter as set forth in claim 6, wherein the chimney is formed generally perpendicular to the top of said filter housing, and said filter housing further comprises a slanted surface between the top of said filter housing and said chimney, wherein said slanted surface is not perpendicular to either said top surface or said chimney.

10. An axle driving apparatus as set forth in claim 6, further comprising a poppet mounted in said opening in said chimney, said poppet having a top surface shaped to prevent contaminants in said oil sump from entering said opening.

11. A filter for a hydrostatic transmission assembly mounted in a housing forming an oil sump, comprising:
- a filter housing forming an internal volume;
- a filter associated with said filter housing to filter oil passing from said sump to said internal volume; and
- an opening at the top of said filter housing to permit air to escape from said internal volume to said sump.

12. A filter as set forth in claim 11, further comprising a poppet mounted in said opening, said poppet having a top surface shaped to prevent contaminants in said oil sump from entering said opening.

13. A filter as set forth in claim 12, further comprising a lip formed around the periphery of said opening.

14. A filter as set forth in claim 11, further comprising a chimney integrally formed with said filter housing, wherein said opening is located at the top of said chimney.

15. A filter as set forth in claim 14, wherein said chimney is generally tubular in shape.

16. A filter as set forth in claim 11, wherein said filter is secured directly to said filter housing.

17. An axle driving apparatus comprising:
- a housing forming an oil sump;
- a hydrostatic transmission mounted in said housing and comprising a hydraulic pump and hydraulic motor and connected through hydraulic porting, said hydraulic porting having at least one check opening;
- a structure secured in said housing and defining an internal volume having a first opening open to said check openings and a second opening open to said sump;
- a filter located in said second opening to filter fluid passing from said oil sump into said internal volume;
- a chimney formed adjacent to and extending upwardly from said internal volume of said structure and having an opening formed at the top of said chimney to permit air to move from said internal volume to said sump.

18. An axle driving apparatus as set forth in claim 17, wherein said chimney is integrally formed with said structure.

19. A filter as set forth in claim 18, wherein said chimney is generally tubular in shape.

20. An axle driving apparatus as set forth in claim 17, wherein said filter is secured directly to said structure.

21. An axle driving apparatus as set forth in claim 17, further comprising a poppet mounted in said opening in said chimney, said poppet having a top surface shaped to prevent contaminants in said oil sump from entering said opening.

22. An axle driving apparatus as set forth in claim 17, further comprising a lip formed at the top of said chimney around said opening.

\* \* \* \* \*